United States Patent [19]
Luther-Davies et al.

[11] Patent Number: 5,469,525
[45] Date of Patent: Nov. 21, 1995

[54] PHOTONIC DEVICES USING OPTICAL WAVEGUIDES INDUCED BY DARK SPATIAL SOLITONS

[75] Inventors: Barry Luther-Davies, Bruce; Yang Xiaoping, Endeavour Hills, both of Australia

[73] Assignee: The Australian National University, Acton, Australia

[21] Appl. No.: 313,169

[22] Filed: Dec. 7, 1994

[30] Foreign Application Priority Data

Apr. 7, 1992 [AU] Australia ................ PL 1803

[51] Int. Cl.$^6$ ............................ G02F 1/35
[52] U.S. Cl. ........................ 385/122; 359/332
[58] Field of Search .................. 359/326–332; 372/21, 22; 385/1–3, 15, 27, 39, 122

[56] References Cited

U.S. PATENT DOCUMENTS

| | | | |
|---|---|---|---|
| 4,928,282 | 5/1990 | Barthelemy et al. | 372/21 X |
| 4,932,739 | 6/1990 | Islam | 385/15 X |
| 4,962,987 | 10/1990 | Doran | 385/122 X |
| 5,078,464 | 1/1992 | Islam | 385/122 |
| 5,101,456 | 3/1992 | Islam | 385/27 |
| 5,157,744 | 10/1992 | Korotky | 385/2 |

FOREIGN PATENT DOCUMENTS 8802876  4/1988  WIPO.

Primary Examiner—John D. Lee
Attorney, Agent, or Firm—Sughrue, Mion, Zinn, Macpeak & Seas

[57] ABSTRACT

Optical switching devices for use in photonics applications are created in a body of an optically transparent defocusing material having a third order non-linear susceptibility which is negative. The switching devices use optical waveguides which are created by the propagation through the material of dark spatial solitons, which are induced when an intense quasi-planar light wave, having an amplitude or phase perturbation to at least one point or region of its wavefront, is projected onto at least one location on the surface of the body, to cause a change in its refractive index at the (or each) location. If the change in refractive index is rapid and transitory, an active photonic device is created. The devices created include steerable optical switches, cross-couplers, and multi-port optical switchyards.

16 Claims, 5 Drawing Sheets

PHOTONIC DEVICES USING OPTICAL WAVEGUIDES INDUCED BY DARK SPATIAL SOLITONS

TECHNICAL FIELD

This invention concerns optical switching devices. More particularly, it concerns optical switching devices created by optical waveguide structures formed in a defocusing non-linear medium by dark spatial solitons. The dark spatial solitons are created by the imposition of a perturbation upon the wave front of a quasi-plane wave, which is incident upon the medium.

BACKGROUND TO THE INVENTION

In his article entitled "Solitary Waves", which was published in *American Scientist*, Volume 80, pages 350 to 361, 1992, Russell Herman provides a review of the phenomena known as "solitary waves", which were termed "solitons" by N. J. Zabusky and M. D. Kruskal following their work with computer simulations of the interactions of solitary waves in the 1960s. In the concluding section of his article, Dr. Herman notes that in the field of optical communications, electromagnetic solitons may be used in fibre optic transmissions, but admits that no practical fibre-optic system has been produced and that, in other areas, electromagnetic solitons remain a subject "for theoretical investigations and potentially practical applications".

The present invention represents a practical application of solitons in what are known as defocusing non-linear media, such as polymers; sol-gels; glasses or crystals doped with non-linear molecules which provide thermal or electronic non-linearities; semiconductors; and semiconductor-doped glasses. (This list is not exhaustive.)

In an optically transparent defocusing non-linear medium, dark solitons exist as regions of low light intensity contained within a higher intensity background. They are formed when an intense quasi-plane wave (such as a wavefront produced by a laser) is incident upon the medium and a suitable perturbation is applied to the propagating wavefront. Suitable perturbations include (a) one-dimensional and two-dimensional phase perturbations, (b) one-dimensional and two-dimensional amplitude perturbations, and (c) combinations of both amplitude and phase perturbations. In the case of phase perturbations, the local phase of the quasi-plane wave changes across a boundary, or boundaries, or at some point, within the wavefront. To effect an amplitude perturbation of the wavefront, the quasi-plane wave may be passed through a partially or totally occluding mask.

Spatial solitons are formed in the defocusing medium by the non-linear interaction between the propagating wavefront of the beam and the medium. The solitons appear as dark regions (such as stripes, grids, dots or rings) in the light beam after some distance of travel, hence the adoption of the term "dark solitons". The light intensity in the darkest region of a soliton can approach zero, in which case the soliton is termed a "black soliton". Other dark solitons are called "grey solitons".

The dark solitons propagate without diffracting. For this to be possible, the non-linear medium must have a negative value of its third order non-linear susceptibility (that is, the refractive index of the medium must decrease with increasing light intensity). Black solitons always propagate parallel to the wave-vector (k-vector) of the soliton-forming beam. Grey solitons propagate at finite angles to the wave-vector.

The decrease in the refractive index of the non-linear medium when a soliton-forming beam is projected into it can be fast or slow. In the former case, there is an instantaneous change in the refractive index in response to changes in the intensity of the soliton-forming beam. If, however, the decrease in the refractive index of the medium is slow, the refractive index responds to the total energy delivered by the soliton-forming beam, integrated over an appropriate interval. Furthermore, the change in refractive index can be transitory (occurring only while the soliton-forming beam is present), or it may be permanent (in which case the change in refractive index in the medium remains after the soliton-forming beam is no longer present).

A refracting structure is created in the non-linear medium by the dark solitons. Since the refractive index of the defocusing non-linear medium decreases with increasing light intensity, the refractive index in the darkest region of the solitons is higher than in the brighter regions of the beam surrounding it. The refracting structure thus formed in the vicinity of the soliton acts to guide the soliton-forming beam in a manner similar to that of an optical fibre or an ordinary linear slab waveguide. In the soliton case, however, the soliton-forming beam itself induces the waveguiding structure. Thus solitons can be thought of as self-guided waves with the specific condition that the soliton is a mode of the waveguide that it creates. However, in comparison with optical fibres (where the radiation is confined within the waveguide), for a dark soliton, the radiation in the soliton-forming beam is located outside the waveguide. Hence, whereas the guided beam in an ordinary optical fibre is a bound mode of the waveguide, dark solitons are equivalent to radiation modes of the waveguide which the field induces.

The present inventors, in their paper entitled "Waveguides and Y Junctions formed in Bulk Media by using Dark Spatial Solitons", which was published in *Optics Letters*, volume 17, pages 496 to 498, 1992, have described how dark spatial solitons can be used to form adiabatically tapered waveguides, and waveguide Y junctions. The disclosures in that paper are incorporated into this specification by this reference to that paper. At the time of writing that paper, the present inventors commented upon the potential to use optical waveguides induced by dark solitons as "light-controllable structures", but they presented no indication of how such practical structures could be created.

DISCLOSURE OF THE PRESENT INVENTION

It is an object of the present invention to provide optical switching devices, for use in photonics applications, using dark spatial solitons. (It should be noted that, in this specification, the term "switching devices" means devices which guide or manipulate a light beam.)

To achieve this objective, the present inventors use the fact that a dark soliton induces an optical waveguide in a defocusing non-linear medium, and the induced waveguide can also support bound modes, like those existing in an optical fibre. Hence, if a second, probe beam is launched simultaneously into the non-linear medium coaxially with the intense soliton-forming beam, the probe beam can propagate as a bound mode of the waveguide that is induced by the soliton-forming beam. Thus a situation is created where one light beam guides a second light beam, for the soliton-induced waveguides are inherently single mode waveguides for probe beams having a wavelength equal to or longer than that of the soliton-forming beam.

In non-linear materials where the change in refractive index produced by the soliton-inducing beam is transitory, the induced waveguide for the probe beam can be created or removed at will, simply by switching the soliton-inducing beam on and off. Alternatively, the induced waveguide can be reconfigured by changing the perturbation superimposed upon that beam, or by varying its intensity. Accordingly (the present inventors hypothesised), it should be possible to manipulate or switch the probe beam by varying the properties of the induced waveguide, and thus make active optical switches and other important photonic devices. And in the case where the refractive index change of the material is permanent, it should be possible to use dark solitons to fabricate permanent waveguide structures.

Subsequent experimental work has shown that this hypothesis was valid.

Thus, according to the present invention, there is provided a method of making a photonic device, said method comprising the steps of (a) projecting a quasi-plane wave light beam into a body of an optically transparent material, said material having a third order non-linear susceptibility which is negative; and (b) applying a perturbation to at least one point or region of the wavefront of said quasi-plane wave, to thereby form at least one dark spatial soliton in the material at the (or each) location where the perturbation is incident upon the surface of the body;

whereby said (or each) dark spatial soliton effectively propagates through the body to create an optical waveguide in the material, extending from said (or each) location to an (or a respective) outlet region of the material, so that a second light beam, if incident upon said location (or one of said locations), is conducted to the (or the associated) outlet region by the soliton-created optical waveguide.

The present invention also encompasses a range of photonic devices made by this method.

The body of material may be essentially two-dimensional (in which case it will be a thin film) or it may be a three-dimensional body. As noted above, the (or each) induced waveguide will be a single mode waveguide for the second light beam if the second light beam has a wavelength equal to or longer than the wavelength of the quasi-plane wave light beam.

The number of soliton-induced optical waveguides created in the body of material will depend upon the number of perturbations of the wavefront, and the nature of those perturbations, as will be demonstrated in the following description of embodiments of the present invention, which constitute examples only of the invention. In the following description, reference will be made to the accompanying drawings.

DETAILED DESCRIPTION OF THE ILLUSTRATED EMBODIMENTS

All of the structures created by the method of the present invention rely upon the sensitivity of the exact soliton structure, which is formed in the non-linear material when a soliton-forming beam is projected into the medium, to the form of the input perturbation of the wave-front of that beam.

Now there are several ways by which the input of the soliton-forming beam to the non-linear medium may be adjusted. These include (a) varying the intensity or the intensity distribution of the quasi-plane wave;

(b) varying the size of the phase shift that is imposed by the perturbation between the wavefronts on either side of the soliton;

(c) varying the amplitude perturbation that is superimposed upon the soliton-forming beam in the vicinity of the solitons;

(d) varying the position of the perturbation relative to the input to the non-linear medium (for example, by introducing a region of linear diffraction); and (e) varying the number of phase jumps imposed upon the input beams.

Varying the intensity of the soliton forming beam can be used to determine (i) the width of the dark soliton; (ii) the number of dark solitons that form at the input to the non-linear medium; and (iii) the angle a particular dark soliton makes with the average wave-vector of the soliton-forming beam. Alteration of the phase shift across the soliton-forming beam can be used to vary the angle that the (or each) soliton makes with the average wave-vector of the soliton-forming beam, and to determine whether the number of solitons that form from a single perturbation when the intensity of the beam is increased is an odd or an even number sequence. The size and shape of the amplitude perturbation determine the number of dark solitons that form at a given input intensity. The length of the linear diffraction region determines (i) the shape of the induced waveguides in the region where the dark soliton forms; (ii) the number of dark solitons that form at a given input intensity from a single perturbation; and (iii) in some conditions, the direction that the dark solitons travel in the transition zone. The number of phase jumps determines the number of dark solitons that form.

It should be noted that there are several means of adjusting the direction at which a soliton propagates through the medium. For example, changing either the input intensity or the phase shift across the soliton-forming beam will cause a variation in the direction of propagation. There are also several ways of changing the number of solitons that form, including (a) varying the input intensity, (b) varying the width of the amplitude perturbation, (c) varying the linear diffraction distance, and (d) varying the relative phase shift across the soliton.

Figure 1:
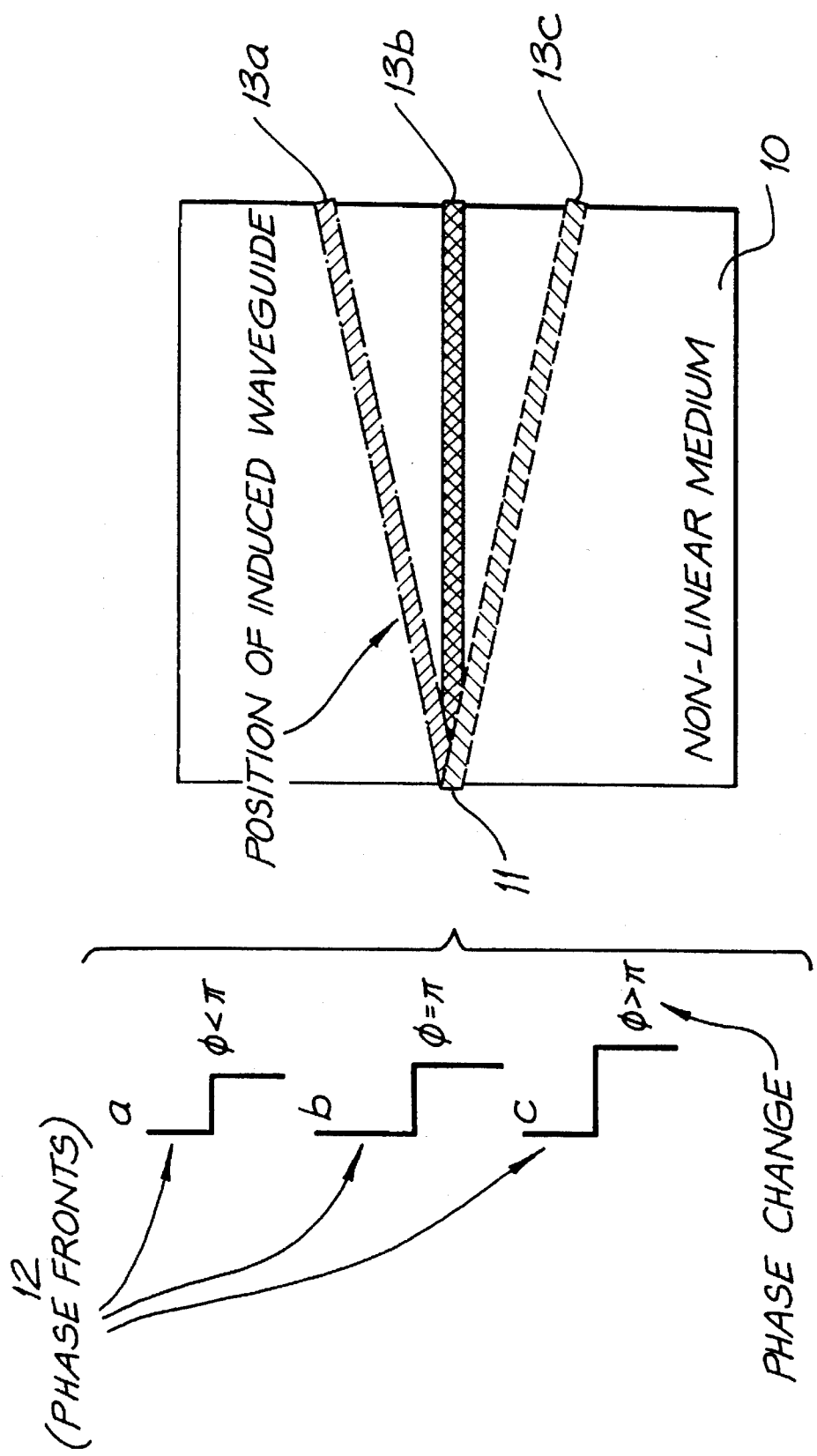
FIG. 1 is a partly schematic illustration of how selection of a phase change across a soliton-forming beam can be used to create a steerable single optical waveguide within a defocusing non-linear medium.

FIG. 1 illustrates %he simplest reconfigurable structure that can be created by the present invention. In the arrangement illustrated in FIG. 1, an intense soliton-forming beam enters the body of a non-linear medium 10 at the input region or location 11. The three symbolic phase front illustrations 12 at the left of FIG. 1 show three alternative phase jumps (perturbations) within the input quasi-plane wave.

In the case of the wavefront referenced "b", the phase jump (φ) imposed by the perturbation of the wavefront is π. The single soliton produced by the input beam in this situation propagates from the input region 11 to the output region 13b, and creates an optical waveguide within the medium 10, extending from the input 11 to the output region 13b.

If the phase jump φ of the soliton-forming beam is less than π (that is, if the input beam has the perturbation shown for wave-front "a"), the soliton travels from the input location 11 to the output region 13a. And if the phase jump φ that is created by the perturbation of the soliton-forming beam is greater than π, the soliton propagates from the input location 11 to the output region 13c. Each propagating dark soliton induces an associated optical waveguide. Thus control of the phase jump perturbation across a boundary in the input beam enables the optical waveguide that is created in the non-linear medium to be steered to a required output region of the body of the non-linear medium 10. In a photonic device, the input location 11 is an input port for the probe beam, and the output regions 13a, 13b and 13c constitute output ports for the probe beam.

The ability to steer beams guided within the waveguides induced by the dark solitons has been demonstrated by the present inventors in their paper entitled "Steerable Optical Waveguides formed in Self-defocusing Media using Dark Spatial Solitons", which was published in *Optics Letters*, volume 17, pages 1755–1757, 1992. The disclosures in the paper are incorporated into this specification by this reference to that paper.

A more detailed explanation of operation of the device illustrated in FIG. 1 follows.

A criterion which determines the number of dark solitons that form in the non-linear medium 10 from a single perturbation is related to what is known as the "V-parameter" of the waveguide that is induced at the input location 11. To calculate the V-parameter, it is only necessary to know the intensity distribution of the light at the input location 11 and the way in which the refractive index of the medium changes with intensity. From this known variation of refractive index with intensity, it is possible to determine the refractive index profile of the induced waveguide and hence its V-parameter. In practice, it is possible to approximate the induced waveguide by a slab waveguide with an abrupt refractive index change at the boundary. In this case:

$$V = k_o d \sqrt{n1^2 - n2^2}$$

where n1 is the refractive index inside the equivalent slab waveguide, and n2 is the refractive index outside the equivalent slab waveguide.

For the generation of a single soliton, $V \leq \pi$, and the phase change across the soliton is $\phi = \pi + \delta$, where $|\delta|$ is normally less than π. (In some media, where the change in refractive index with increasing intensity displays saturation, this last restriction may not apply.)

Now a soliton supported by a field with a phase change other than π travels at an angle to the wave-vector of the soliton-forming field. The axis of the soliton makes an acute angle with the $\phi = 0$ reference phase front when $\delta < 0$ and it makes an obtuse angle with the $\phi = 0$ reference phase front when $\delta > 0$. To steer the waveguide produced by the soliton, therefore, it is only necessary to adjust the magnitude of δ about zero. At $\delta = 0$, the soliton travels approximately parallel to the wave-vector of the field. Thus, by controlling δ, it is possible to make connections between a single input port 11 and multiple output ports 13a, 13b, 13c . . . Controlling the relative phase of the field can be achieved by several means, including (a) mechanical control of the angle of a stepped phase mask, (b) electro-optic control of a phase mask, and (c) light-induced control of a phase mask.

As will now be shown, the steerable single waveguide can form the basis of a multiple input optical switchyard.

Figure 2:
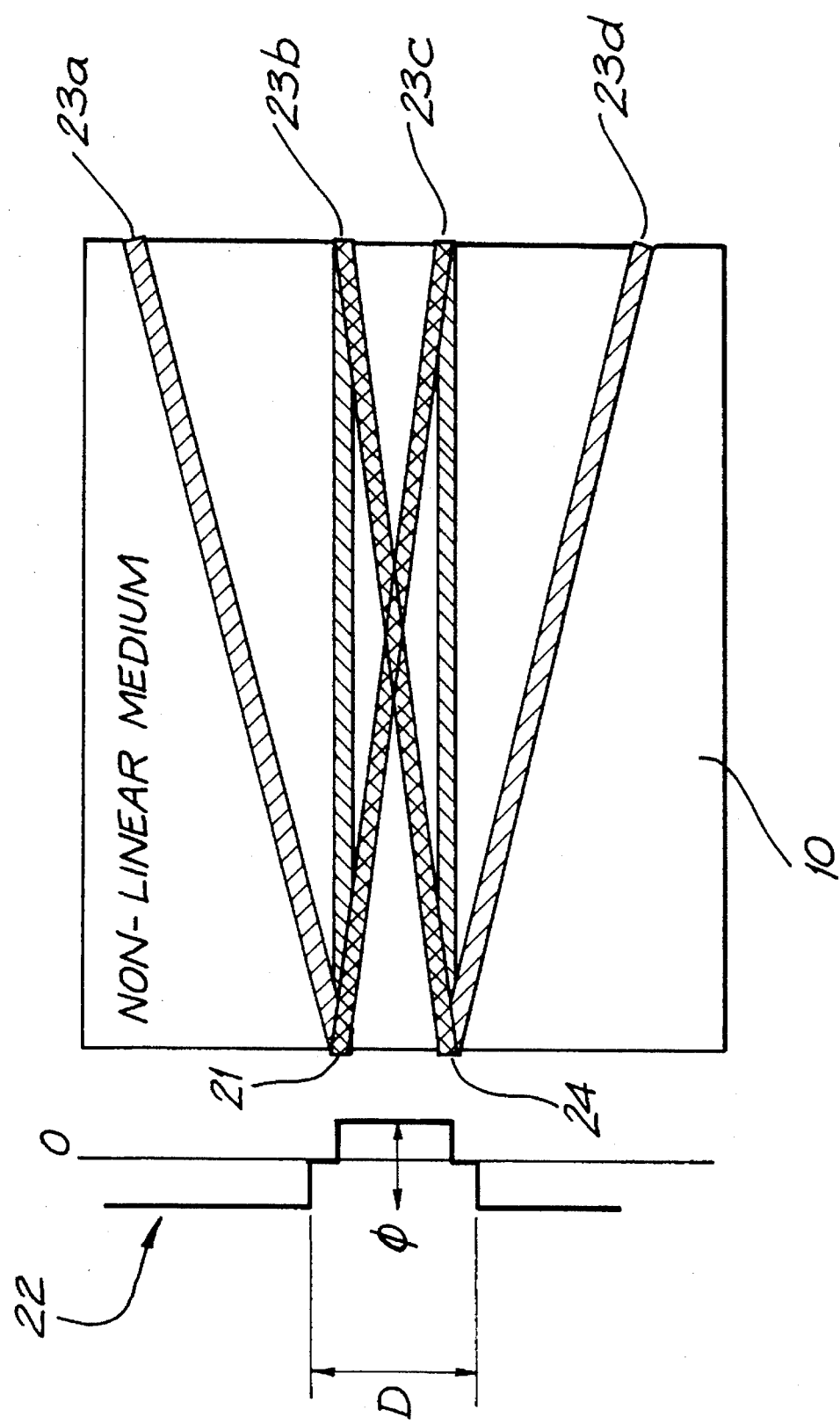
FIG. 2 illustrates how two perturbations of a soliton-forming beam can be used to create a two input port, reconfigurable optical waveguide device.

A photonic device having two input ports and four output ports, relying on similar principles to those of the steerable waveguide of FIG. 1, is shown in FIG. 2. It should be apparent from the above discussion that the requirements for the creation of this four-port device are that there are two perturbations across respective, spaced apart, boundaries in the wavefront of the soliton-forming beam (shown schematically at 22) and (a) a phase shift is imposed on the soliton-forming beam at the position of each input port; and (b) a respective single soliton is formed at each of the two boundaries of the phase shifted zone.

The direction at which the solitons formed at the input regions 21 and 24 propagate through the non-linear medium 10 is determined by the value of the phase shifts $\delta_1$, $\delta_2$ at each boundary, and can be varied mechanically, electrically or optically. For $\delta_1 = \delta_2 = \pi$, the pair of solitons travel approximately parallel through the non-linear material if the value of their separation D is large. If $\delta_1 < \pi$ and $\delta_2 > \pi$, the axes of the propagating solitons diverge, and if $\delta_1 > \pi$ and $\delta_2 < \pi$, the axes of the propagating solitons converge. Any combination of $\delta_1$ and $\delta_2$ can be used to direct the solitons in arbitrary directions. The exact angle of convergence or divergence depends on the magnitude of $\delta_1$ and $\delta_2$. Probe beams launched down the soliton axes are trapped within the induced waveguides and emerge from the non-linear median at the output regions 23a, 23b, 23c and 23d, which are where the optical waveguides created by the solitons at inputs 21 and 24 leave the non-linear medium 10.

It will be apparent that a wide range of input and output configurations exist for the device illustrated in FIG. 2. Among the possible configurations are the X-junction; parallel waveguides; and an arrow Junction. An optical change over switch can be constructed using a device configuration which can be changed from the parallel waveguides structure to the X-junction waveguides structure. It will also be apparent that the pair of input ports can be selectively directed to numbers of pairs of output ports. Thus the steerable four port device can form the basis of an optical switchyard having two input ports.

Figure 3:
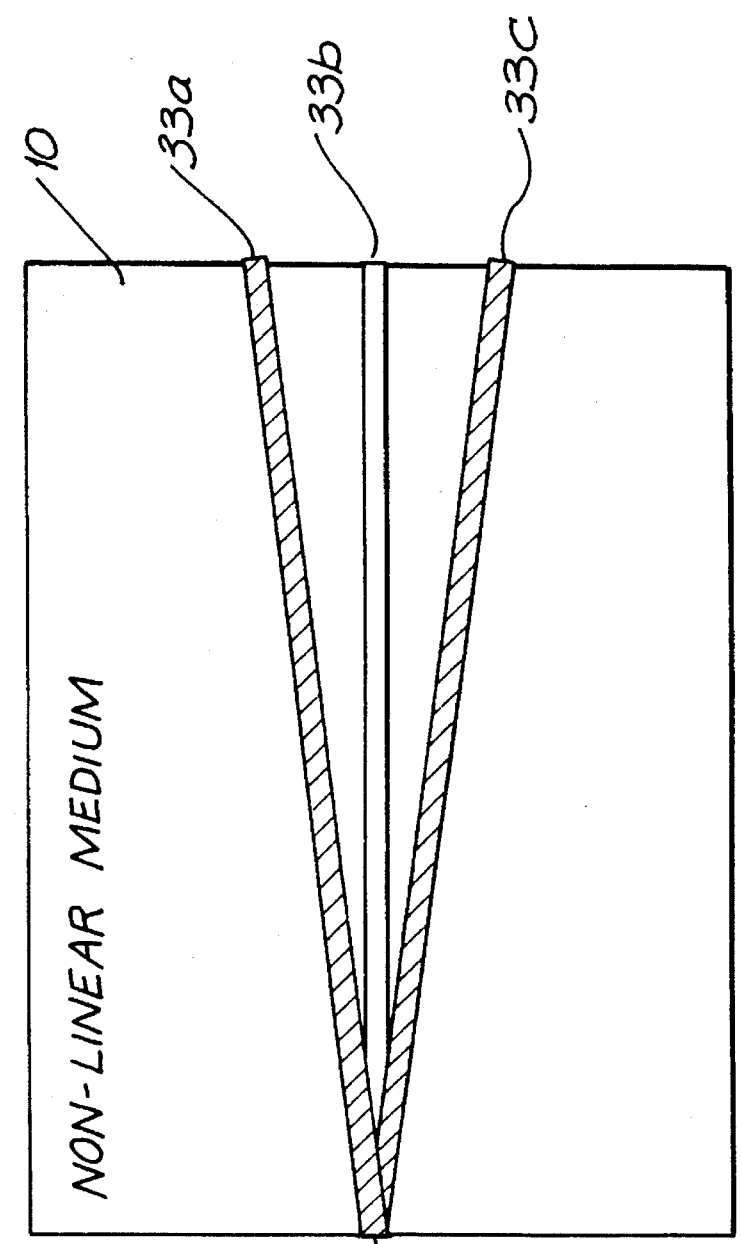
FIG. 3 shows how two soliton-forming beams may be used to create a one-port to three-port reconfigurable optical waveguide device.

FIG. 3 illustrates how the use of two soliton-forming beams can produce an optical switch, between (i) a straight connection from an input port 31 to an output port 33b, and (ii) the input port 31 and a pair of output ports 33a and 33c (that is, with the device acting as a Y-junction). To create this device, the waveguide parameter V is low (V<2π), so that the dark soliton structure is determined only by the phase change of the background field. Thus if the phase change $\phi = \pi$, a single black soliton forms (resulting in a two port waveguide) and for $\phi = 0$, a pair of diverging dark solitons form the equivalent of a waveguide Y-junction. Both of the two possible states of this device are shown in FIG. 3.

Figure 4:
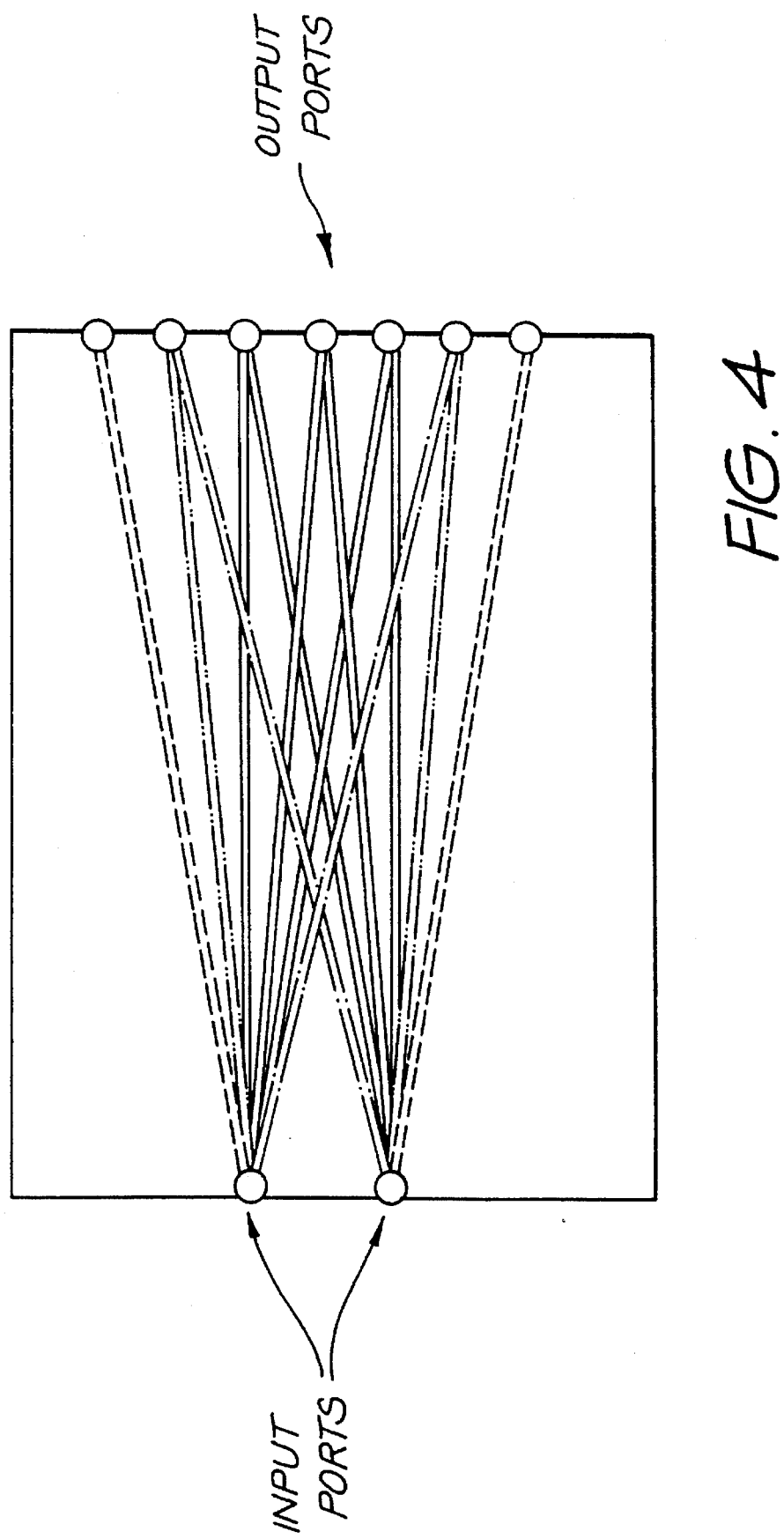
FIG. 4 is a schematic representation of an optical switchyard produced using the present invention.

An optical switchyard is illustrated in FIG. 4. This particular switchyard has two input ports and seven output ports, although it will be apparent that, in principle, any number of input and .output ports could be adopted. Such optical switchyards are formed using a combination of the techniques described above with reference to FIGS. 1, 2 and 3.

Figure 5:
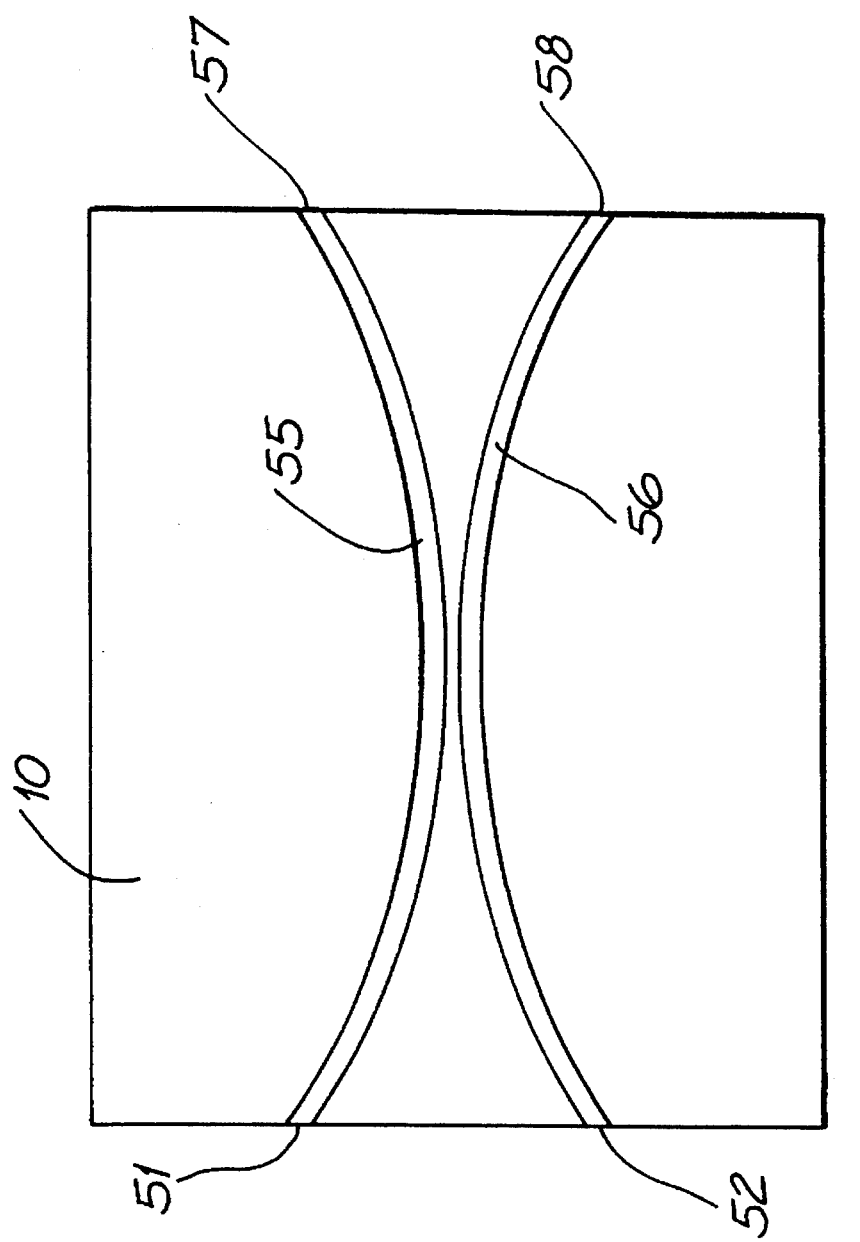
FIG. 5 is a schematic illustration of a four port waveguide coupler which can act as a wavelength demultiplexer, created using the present invention.
Figure 5:
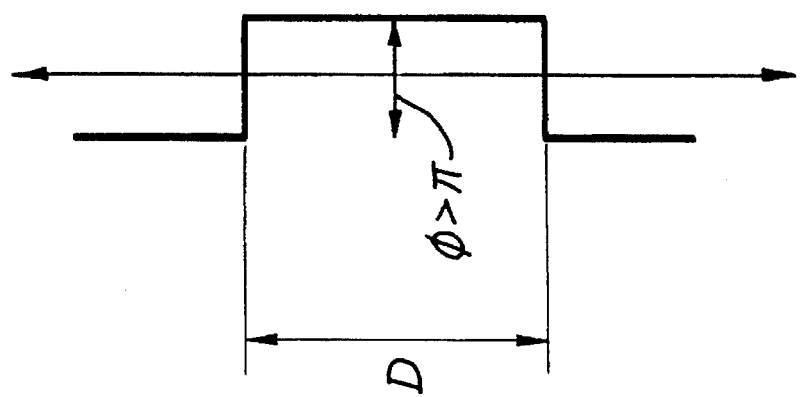

The device illustrated in FIG. 5 is a four-port optical coupler. This device is formed when two dark solitons are directed towards each other at small angles. It is equivalent to the x-configuration of the two input ports, four output ports device shown in FIG. 2. The differences in the technique required to create the coupler illustrated in FIG. 5 are (i) that the waves on the outside of the solitons are approximately in phase; and (ii) that the region between the solitons is phase shifted by $\phi=\pi+\delta$, where $\delta<\pi$.

Under these conditions, the solitons that propagate through the non-linear medium 10 from input locations 51 and 52 form a structure which is like a directional coupler, as shown in FIG. 5. At the point of closest approach of the optical waveguides 55 and 56 created by the propagating dark solitons, energy from the probe beam is transferred from one induced waveguide to the other. It will be apparent that this optical coupling device can be tuned by varying the value of $\delta$, and that it is sensitive to the intensity of the soliton-forming beam (as are devices of the form illustrated in FIG. 2).

In common with all directional couplers, the input energy fed into one input port is divided between the two output ports in a ratio determined by the wavelength of the propagating beam. In this case, the splitting ratio is determined by the wavelength of the probe beam relative to that of the soliton-forming beam. If the ratio of the wavelengths is unity, then power injected into the input port 51 will emerge at the output port 58 whilst power injected into the input port 52 will Merge at the output port 57. If the wavelength ratio differs from unity, then the power from each input port will be split between the output ports in a ratio determined by $\delta$. Thus this device can be used for wavelength demultiplexing.

An important feature of four port couplers created as shown in FIG. 5 is that they can be created as permanent devices, and they do not require the non-linear material to have a fast non-linearity for their usefulness.

It will be clear from the above description that a range of specific photonics structures can be created using dark solitons, which are configured by appropriate selection of the input perturbation of the wavefront of a quasi-plane wave. In materials that exhibit a fast, non-permanent non-linear optical response, changes in the input perturbations can be used to induce changes in the waveguide structure.

A feature of the soliton-induced structures described with reference to FIGS. 1 to 5 is that those structures are quasi-2-dimensional structures. That is, the intensity of the light changes due to the presence of the soliton in only one spatial direction, approximately normal to the direction of propagation of the soliton. In practice, this is not restrictive, for it is always possible to prepare the non-linear medium as a thin film (that is, as a slab waveguide), so that the soliton-forming beam is guided in the direction orthogonal to the plane in which the solitons form. Thus two dimensional solitons can form planar waveguides which can be used to "fabricate" three dimensional waveguide structures—a major requirement for applications in photonics. In addition, it is possible to form three-dimensional soliton structures in bulk media using two-dimensional phase or amplitude masks. Although there may be useful applications of these purely three-dimensional dark solitons, they have inherent radial symmetry, which means that multiple solitons form as rings. Such radially symmetric structures do not have such clearly useful applications in photonics as do the equivalent two-dimensional solitons formed in cartesian co-ordinates.

Additionally, it is possible to make three-dimensional structures by launching two (1+1) dimensional dark solitons (soliton stripes) into a three-dimensional body of the non-linear medium with their axes orthogonal to one another. These two soliton-forming beams may be either of different wavelengths or of orthogonal polarisations. The first soliton-forming beam generates a planar waveguide. The second soliton-forming beam is coupled into the waveguide formed by the first beam. The second beam contains an appropriate phase or amplitude perturbation so that a dark soliton forms within the waveguide generated by the first soliton-forming beam, with the "plane" of this second dark soliton stripe being in a direction orthogonal to that formed by the first beam. Thus a three-dimensional waveguide is formed. By changing the perturbations on the two soliton-forming beams, the induced waveguide can be scanned in three dimensions. It will be clear from the above discussions that many such three-dimensional soliton induced waveguides may be formed in this manner.

It should be apparent from the above description that the devices illustrated in the accompanying drawings and the techniques described with reference to the drawings are examples only of the implementation of the present invention. Modifications of those devices and techniques (for example, using amplitude perturbations of the soliton-forming beam) can be adopted, without departing from the present inventive concept, to produce other specific optical waveguide structures which are useful for guiding light beams and with applications in the field of photonics.

We claim:

1. A method of making a photonic device, said method comprising the steps of (a) projecting a quasi-plane wave light beam into a body of an optically transparent material, said material having a third order non-linear susceptibility which is negative; and (b) applying a perturbation to at least one point or region of the wavefront of said quasi-plane wave, to thereby format least one dark spatial soliton in the material at the or each location where the perturbation is incident upon the surface of the body;

whereby said or each dark spatial soliton effectively propagates through the body to create an optical waveguide in the material, extending from said or each location to an or a respective outlet region of the material, so that a second light beam, if incident upon said location or one of said locations, is conducted to the or the associated outlet region by the soliton-created optical waveguide.

2. A method as defined in claim 1, in which said body is a thin film.

3. A method as defined in claim 1, in which said second light beam has a wavelength equal to or longer than the wavelength of said quasi-plane wave light beam, whereby said or each soliton-created optical waveguide is a single mode waveguide for said second beam.

4. A method as defined in claim 3, in which said body is a thin film.

5. A method as defined in claim 1, in which said material exhibits a transitory change in refractive index when said quasi-plane light beam is projected into said material, whereby said photonic device is an active device.

6. A method as defined in claim 5, in which said perturbation is applied to said wavefront to establish a single change of phase or amplitude across a boundary in said wavefront, thereby creating a single optical waveguide within said material, the direction of propagation of said waveguide being determined by the magnitude of said change of phase or amplitude.

7. A method as defined in claim 5, in which said perturbation is applied to said wavefront to establish a plurality of spaced apart changes of phase or amplitude across respective boundaries in said wavefront, thereby creating dark solitons at an equal plurality of locations on the surface of said body and an equal plurality of optical waveguides within said material, each optical waveguide extending from a respective one of said locations to an associated outlet region of said body, the positions of said outlet regions being determined by the magnitude of said changes of phase or amplitude.

8. A method as defined in claim 7, in which said changes of phase or amplitude are equal in value.

9. A method as defined in claim 7, in which said plurality is two.

10. A method as defined in claim 5, in which said non-linear material is a material selected from the group consisting of: liquid polymers, solid polymers, sol-gels, crystals and semiconductors, all containing a dye or other molecules having fast non-linear optical responses.

11. A method as defined in claim 5, in which said body is a thin film.

12. A method as defined in claim 1, in which
(a) said body is a three-dimensional body;
(b) said second beam is also a soliton-forming beam, having either a wavelength which is different from said quasi-plane wave light beam or a polarisation which is orthogonal to said quasi-plane wave light beam;
(c) said second beam is coupled into the or each planar optical waveguide created by said quasi-plane wave and forms a dark spatial soliton therein in the form of a dark spatial soliton stripe extending in a direction which is orthogonal to the plane of said or its associated planar optical waveguide created by said quasi-plane wave;

thereby creating at least one steerable three-dimensional optical waveguide within said body, so that a third light beam, if incident upon said location or one of said locations, is conducted to the or the associated outlet region by said three-dimensional optical waveguide.

13. A method as defined in claim 1, in which said material exhibits an essentially permanent change in refractive index when said quasi-plane light beam is projected into said material, whereby said photonic device is a permanent device.

14. A method as defined in claim 13, in which said perturbation is applied to said wavefront to establish two spaced apart changes of phase across respective boundaries in said wavefront, each of said phase changes having a value of $\phi$, where $\phi=\pi+\delta$, with $\delta<\pi$, whereby dark solitons created by said changes of phase propagate within said material in directions which are convergent at a small angle, thereby establishing respective optical waveguides within said material, said optical waveguides being convergent until in close proximity to each other, then divergent from each other.

15. A method as defined in claim 13, in which said non-linear material is a material selected from the group consisting of: solid polymers, sol-gels, glasses or crystals, all containing a dye or other molecules having a permanent reduction in refractive index when exposed to light.

16. A method as defined in claim 13, in which said body is a thin film.

* * * * *